United States Patent [19]

Bezard et al.

[11] 4,299,703

[45] Nov. 10, 1981

[54] SEPARATOR FOR SEPARATING A MIXTURE OF TWO LIQUIDS

[75] Inventors: Christian Bezard, Saint Ismier; Patrick Deroyer, Sassenage, both of France

[73] Assignee: Alsthom-Atlantique, Paris, France

[21] Appl. No.: 152,964

[22] Filed: May 23, 1980

[30] Foreign Application Priority Data

May 23, 1979 [FR] France ............................ 79 13111

[51] Int. Cl.³ ............................................ B01D 35/00
[52] U.S. Cl. .................................. 210/512.1; 210/522
[58] Field of Search ................. 210/521, 522, DIG. 5, 210/512.1, 304; 55/410, 447; 209/144, 211

[56] References Cited

U.S. PATENT DOCUMENTS

| | | | |
|---|---|---|---|
| 2,479,126 | 8/1949 | Lipscomb | 210/522 |
| 3,510,006 | 5/1970 | Cheysson | 210/522 |
| 3,666,108 | 5/1972 | Veld | 210/522 |
| 3,718,257 | 2/1973 | Bach | 210/521 |
| 3,797,203 | 3/1974 | Murdock | 210/521 |

FOREIGN PATENT DOCUMENTS

| | | |
|---|---|---|
| 2507190 | 9/1976 | Fed. Rep. of Germany . |
| 2540264 | 3/1977 | Fed. Rep. of Germany . |
| 553165 | 5/1923 | France . |
| 1230382 | 9/1960 | France . |

OTHER PUBLICATIONS

The Motor Ship–Feb., 1959, p. 541, "Easily Maintained Lubricating Oil Filter".

*Primary Examiner*—Theodore A. Granger
*Attorney, Agent, or Firm*—Sughrue, Mion, Zinn, Macpeak and Seas

[57] ABSTRACT

The invention relates to a separator for separating a mixture of two immiscible liquids of different densities, one of these being dispersed in the other. The separator which includes, superposed in a cylindrical tank, an injection chamber for injecting the mixture disposed between a coalescence chamber and a collecting chamber for collecting the dispersed component. The injection chamber (2) communicates with the coalescence chamber (3) via an annular passage (72) formed between the wall of the tank (1) and the periphery of a deflector (7) which separates said chambers and is also surmounted by funnels (70) which make the coalescence chamber communicate with the collecting chamber. The invention applies in particular to the treatment of bilge water on board ships or to the treatment of ballast water on board oil tankers.

8 Claims, 2 Drawing Figures

SEPARATOR FOR SEPARATING A MIXTURE OF TWO LIQUIDS

FIELD OF THE INVENTION

The invention relates to a separator for separating two immiscible liquids of different densities, one of these liquids being dispersed in the other. Such a separator is used currently in particular on board ships for treating bilge water or on board oil tankers for treating the ballast water or else for treating water on off-shore platforms.

BACKGROUND OF THE INVENTION

The two components are separated in equipment which includes, on either side of an injection chamber, a coalescence chamber in which the dispersed component is separated from the principal component, and a collecting chamber for collecting the dispersed component (which is generally the lighter of the two) said collecting chamber being disposed above the injection chamber. In some equipment where separation takes place in a cylindrical tank, the dispersed component, once separated, is then transferred via funnels which make the coalescence chamber communicate with the collecting chamber.

However, such equipment is so designed that, to enter the coalescence chamber, the flow of injected mixture crosses the whole of the dispersed component at high speed, said dispersed component being separated in the coalescence chamber during its migration towards the collecting chamber via the funnels. This causes a new partial dispersion and thus reduces the efficiency of the coalescence chamber. Further, the injector, which is small and to one side forces the mixture to diffuse centripetally and not very homogenously. This is not favourable to preliminary separation by the cyclone effect. Further, the inclination of the coalescence plates does not always lead to proper operation thereof, especially when the viscosity of the dispersed liquid is high.

Preferred embodiments of the invention provide a separator for separating a mixture of two liquids whose design remedies the aforementioned drawbacks while being simple to produce and having little bulk.

SUMMARY OF THE INVENTION

The invention provides a separator for separating a mixture of two immiscible liquids of different densities, one of these being dispersed in the other, said separator including, superposed in a cylindrical tank, an injection chamber for injecting the mixture and disposed between a coalescence chamber, and a collecting chamber for collecting the dispersed component, characterized in that the injection chamber communicates with the coalescence chamber via an annular passage formed between the wall of the tank and the periphery of a deflector which separates said chambers, and is surmounted by funnels which make the coalescence chamber communicate with the collecting chamber, and in that the injection chamber is provided with a static central injector which has vanes which impart a centrifugal rotating motion to the mixture.

The coalescence chamber is disposed concentrically round a tubular collector for collecting the continuous component, the coalescent chamber including a series of frustoconical coalescence plates which bear on said collector and are inclined at about 35° with respect to the vertical in the direction of the injection chamber, the gap between two plates communicating with said collector via orifices in which there is loss of head.

The funnels are disposed perpendicularly to the periphery of the coalescence plates.

The deflector is constituted by a frustoconical plate disposed parallel to the coalescence plates and its periphery includes a rim beyond the funnels, said rim being inversely inclined. The injector is disposed in the conical part of the deflector. The central part of the collector has a pipe for supplying the static injector. The collecting chamber for collecting the dispersed component is cylindrical and is disposed in line with the injection chamber. The volume of the coalescence chamber is of the same order of magnitude as the total volume of the injection chamber and of the collecting chamber.

DESCRIPTION OF THE PREFERRED EMBODIMENT

Figure 1:
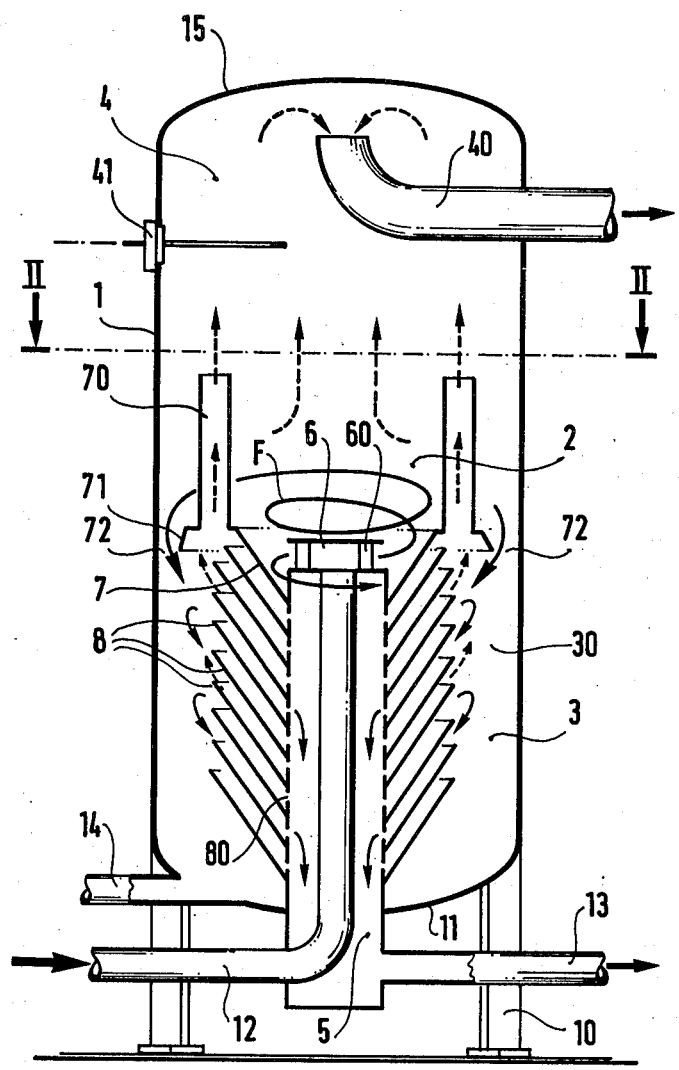
FIG. 1 is a schematic vertical sectional view of a preferred embodiment of the present invention.
Figure 2:
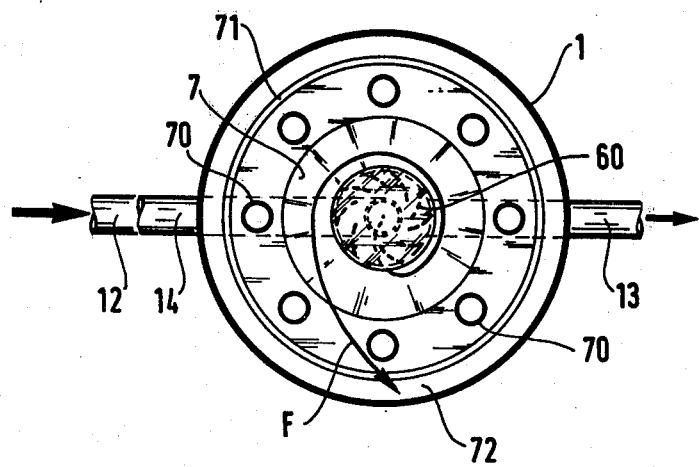
FIG. 2 is a horizontal sectional view of the apparatus of FIG. 1 taken about line II—II.

The characteristics and advantages of the invention will become apparent from the description of one embodiment given by way of example and illustrated in the figures of the drawings. In the drawing, 1 designates the cylindrical tank of a separator in accordance with the invention resting on the ground on legs 10. The central part of the tank 1 includes an injection chamber 2 disposed between a coalescence chamber 3 which occupies the lower part and a collecting chamber 4 which occupies the upper part.

The injection chamber 2 is separated from the coalescence chamber 3 by a frustoconical deflector 7. A tubular collector 5 is aligned with the axis of the coalescence chamber. The collector 5 therefore passes through the bottom 11 of the tank 1 and the deflector 7. A series of regularly spaced coalescence plates 8 inclined at about 35° with respect to the vertical in the direction of the injection chamber 2 is disposed round the wall of the collector 5.

The space comprised between two adjacent plates 8 communicates with the collector 5 via loss of head units 80 which are regularly spaced round its wall. The deflector 7 itself is inclined and is parallel to the plates 8 so that its lower wall also constitutes a coalescence plate in cooperation with the uppermost plate of the series of plates 8. Funnels 70 are disposed at the upper edge of the deflector 7 where they are regularly spaced out perpendicularly to the periphery of the plates 8, whereas the periphery of the deflector 7 has a rim 71 which extends radially beyond the funnels 70, the direction of inclination of said rim being the reverse of that of deflector 7. The funnels 70 thus make the top of the coalescence chamber 3 communicate with the collecting chamber 4 via the injection chamber 2.

The tubular collector 5 passes through firstly the bottom 11 of the tank 1 and secondly the center of the frustoconical deflector 7. A pipe 12 for feeding mixture to the separator enters the lower part of the collector 5 under the bottom 11. The pipe 12 is also aligned with the axis of the collector 5 to communicate with the injection chamber 2 in the conical part of the deflector 7 via a static injector 6 provided with vanes 60. The lower part of the collector 5 also includes a pipe 13 for removing the principal component of the mixture, whereas the tank 1 has an orifice 14 for removing any sediment, said orifice being situated above the bottom 11.

The collecting chamber 4 is disposed in line with the injection chamber 2. The volume occupied by the coalescence chamber 3 is of the same order of magnitude as the total volume of the injection chamber 2 and of the collecting chamber 4. A discharge pipe 40 for the dispersed component which has been separated is disposed at the top part of the tank 1 whose wall it passes through. The inlet orifice of the pipe 40 is disposed adjacent the top 15 of the tank 1.

The operation of the separator is as follows. The mixture of liquids which enters the separator via the pipe 12 is injected into the injection chamber 2 via the injector 6 whose vanes 60 impart thereto a homogenous rotating movement which is also an ascending movement due to the inclination of the deflector 7 as shown by the arrow F. During said movement, the mixture undergoes a preliminary separation due to the cyclone effect which drains part of the dispersed component towards the upper part in the collecting chamber 4. However, the flow of the injected mixture enters the coalescence chamber 3 via the annular space 72 between the rim 71 and the wall of the tank. The mixture enters the zone 30 between the periphery of the coalescence plates 8 and the wall of the tank in the space formed between two adjacent plates 8, then via the loss of head units 80, the collector 5. Along the path between the plates 8, the dispersed component of the mixture is separated from the principal component by decanting and coalescing to rise firstly up along the plates then in the peripheral zone 30 of the plates 8 at whose upper end the dispersed component passes through the funnels 70 into the collecting chamber 4 from which it is removed via the pipe 40. When the dispersed component has been separated from the mixture, as has just been stated, the liquid which enters the collector 5 is constituted by the principal phase which is then removed via the pipe 13.

During these operations, the dispersed component is very well separated in a preliminary stage by homogenous centrifuging of the mixture. Said preliminary separation is not very sensitive to the oscillations to which the separator may be subjected when it is placed on board a ship.

The flow of mixture injected in the coalescence chamber passes through the chamber without crossing the ascending flow of the dispersed component towards the funnels.

The small inclination of the coalescence plates, of the order of 35° provides high efficiency without danger of obstruction in the case of viscous liquids and also provides a large active surface with minimum bulk.

The position of the interface between the dispersed component in the collecting chamber 4 and the mixture injected in the injection chamber 2 can also be controlled either by adjusting the head losses in the outlet pipe 40 for the dispersed component and in the outlet pipe 13 for the principal component or even by a system with an automatic probe 41 which affects the pipes 40 and 13.

The operation of the separator is described taking the case where the dispersed component is lighter than the principal component. In the contrary case, the separator can operate in an analogous manner by inverting the upper and lower parts.

We claim:

1. A separator for separating a mixture of two immiscible liquids of different densities, one of these being dispersed in the other, said separator including, superposed in a cylindrical tank, an injection chamber for injecting the mixture and disposed between a coalescence chamber and a collecting chamber for collecting the dispersed component, a tubular collector for collecting the continuous phase, said coalescence chamber being arranged concentrically around said tubular collector, a deflector separating said coalescence chamber and said injection chamber and forming an annular passage for communicating said injection chamber with the coalescence chamber, said annular passage being formed between the wall of the tank and the periphery of said deflector, funnels surmounting said deflector for communicating the coalescence chamber with the collecting chamber, said injection chamber being provided with a static central injector having vanes for imparting a centrifugal rotating motion to the mixture, a first pipe penetrating the collector and extending axially therethrough for feeding the mixture of the two liquids and opening to the vanes of said static central injector, a second pipe situated at the top of the tank for evacuation of the dispersed phase and a third pipe opening to the base of the collector for evacuation of the continuous phase.

2. A separator according to claim 1, wherein the coalescence chamber includes a series of frustoconical coalescence plates which bear on said collector and are inclined at about 35° with respect to the vertical in the direction of the injection chamber and form a gap between adjacent coalescence plates which communicate with said collector via orifices within said collector in which there is loss of head.

3. A separator according to claim 2, wherein the funnels are aligned with the periphery of the coalescence plates.

4. A separator according to claim 1, wherein the deflector is constituted by a frustoconical plate disposed parallel to the coalescence plates with its periphery including a rim extending beyond the funnels, said rim being inversely inclined.

5. A separator according to claim 4, wherein the injector is disposed in the central conical part of the deflector.

6. A separator according to claim 2, wherein the central part of the collector being said first pipe for supplying the static injector.

7. A separator according to claims 1 or 6, wherein the collecting chamber for collecting the dispersed component is cylindrical and is disposed in line with the injection chamber.

8. A separator according to claims 1 or 6, wherein the volume of the coalescence chamber is of the same order of magnitude as the total volume of the injection chamber and of the collecting chamber.

* * * * *